(12) United States Patent
Cattin (10) Patent No.: US 11,713,103 B2
(45) Date of Patent: Aug. 1, 2023

(54) AIRCRAFT FUSELAGE CONFIGURED TO OFFER THE PASSENGERS A TOTALLY PANORAMIC VIEW OF THE OUTSIDE

(71) Applicant: Projets et Réalisations Sàrl, Sierre (CH)

(72) Inventor: Jean-François Cattin, Sierre (CH)

(73) Assignee: Projets et Réalisations Sàrl, Sierre (CH)

( * ) Notice: Subject to any disclaimer, the term of this patent is extended or adjusted under 35 U.S.C. 154(b) by 0 days.

(21) Appl. No.: 17/517,436

(22) Filed: Nov. 2, 2021

(65) Prior Publication Data
US 2022/0135200 A1    May 5, 2022

(30) Foreign Application Priority Data

Nov. 2, 2020    (CH) .................................... 01402/20

(51) Int. Cl.
*B64C 1/12*    (2006.01)
*B64C 1/06*    (2006.01)
(Continued)

(52) U.S. Cl.
CPC ............... *B64C 1/12* (2013.01); *B64C 1/061* (2013.01); *B64C 1/1492* (2013.01); *B64C 2001/0072* (2013.01); *B64C 2001/0081* (2013.01)

(58) Field of Classification Search
CPC ........... B64C 1/061; B64C 1/065; B64C 1/12; B64C 1/068; B64C 1/069; B64C 1/1407;
(Continued)

(56) References Cited

U.S. PATENT DOCUMENTS

| 2,339,338 | A |   | 1/1944 | Karlik |
| 3,382,630 | A | * | 5/1968 | Chivers ................. E06B 3/5436 411/537 |

(Continued)

FOREIGN PATENT DOCUMENTS

| CA | 2654646 A1 | * | 1/2008 | ............. B64C 1/061 |
| CN | 106892083 A | * | 6/2017 | ............. B60F 5/003 |

(Continued)

OTHER PUBLICATIONS

European Search Report issued in corresponding EP Application 21197249.2, dated Feb. 14, 2022, 3 pages.
(Continued)

*Primary Examiner* — Joshua J Michener
*Assistant Examiner* — Ryan Andrew Yankey
(74) *Attorney, Agent, or Firm* — Burris Law, PLLC (57) ABSTRACT

An aircraft fuselage includes an element forming a skin and a load-carrying structure supporting the element forming the skin. The load-carrying structure includes a plurality of elements forming a spar disposed parallel to an axial direction defined by the fuselage and a plurality of elements forming a frame disposed spaced apart along the axial direction. Each element forming a frame being arranged substantially perpendicularly to the elements forming a spar, where the element forming the skin is fastened on an external perimeter of each element forming a frame by means of fastening elements configured to keep the element forming the skin away from the external perimeter and where the element forming the skin is made of a transparent material.

11 Claims, 6 Drawing Sheets

(51) Int. Cl.
*B64C 1/14* (2006.01)
*B64C 1/00* (2006.01)

(58) Field of Classification Search
CPC ........... B64C 1/1461; B64C 1/14; B64C 1/08;
B64C 1/1492; B64C 3/26
See application file for complete search history.

(56) References Cited

U.S. PATENT DOCUMENTS

| | | | |
|---|---|---|---|
| 3,643,899 A | | 2/1972 | Firestone |
| 4,352,353 A | * | 10/1982 | Bolton ................... B64D 10/00 |
| | | | 128/205.24 |
| 4,482,113 A | * | 11/1984 | Backlund ............. B64C 1/1415 |
| | | | 280/166 |
| 2010/0112355 A1 | * | 5/2010 | Clothier ................ B64C 1/1492 |
| | | | 156/243 |
| 2015/0264230 A1 | * | 9/2015 | Takeda ................... G06T 7/001 |
| | | | 348/95 |
| 2019/0161154 A1 | * | 5/2019 | Linde ...................... B64C 1/069 |
| 2019/0168877 A1 | | 6/2019 | Agajanian |
| 2021/0107620 A1 | * | 4/2021 | Weekes ..................... B64C 3/56 |

FOREIGN PATENT DOCUMENTS

| | | | | | |
|---|---|---|---|---|---|
| CN | 110671399 A | * | 1/2020 | ............. | B64C 1/065 |
| DE | 602875 C | * | 9/1934 | ............. | B64C 1/065 |
| DE | 657909 C | * | 7/1936 | ............. | B64C 1/065 |
| EP | 3153410 A1 | * | 4/2017 | ........... | B29C 70/545 |
| EP | 3546362 A1 | * | 10/2019 | ............. | B64C 1/061 |
| FR | 638665 | | 5/1928 | | |
| FR | 3089947 | | 6/2020 | | |
| GB | 191324872 A | * | 7/1914 | ............. | B64C 1/061 |
| GB | 487032 | | 6/1938 | | |
| JP | 2009292237 | | 12/2009 | | |
| KR | 1020110045856 | | 5/2011 | | |
| RU | 2576832 | | 3/2016 | | |
| WO | WO-2010089436 A1 | * | 8/2010 | ............. | B60F 5/003 |

OTHER PUBLICATIONS

Search Report issued in corresponding CH Application 01402/20, dated Dec. 23, 2020, 2 pages.

* cited by examiner

AIRCRAFT FUSELAGE CONFIGURED TO OFFER THE PASSENGERS A TOTALLY PANORAMIC VIEW OF THE OUTSIDE

CROSS-REFERENCE TO RELATED APPLICATIONS

This application claims priority to and the benefit of CH 01402/20 filed on Nov. 2, 2020. The disclosures of the above applications are incorporated herein by reference.

FIELD

The present disclosure relates to an aircraft offering a panoramic view of the external environment to the passengers sitting inside the aircraft.

BACKGROUND

The statements in this section merely provide background information related to the present disclosure and may not constitute prior art.

Aircraft are generally equipped with windows or portholes in the passenger cabins so as to enable the passengers to see the outside of the aircraft. Nonetheless, these portholes generally have a reduced size because of the structural constraints. The small size of the portholes might limit visibility to outside the aircraft, which might constitute a drawback in the case where the aircraft is intended to fly over famous tourist sites in order to offer to the passengers the possibility of observing these sites in the best possible conditions.

In order to address this issue, passenger cabins are currently equipped with video screens on which the images captured by cameras positioned and directed so as to visualize an area outside the aircraft are projected. Nonetheless, these screens also having a small size, the passengers might feel somehow unsatisfied when observing the exterior of the aircraft only throughout these screens instead of directly observing it throughout the portholes. Moreover, the installed cameras being limited in number, it is not always possible to cover a totally panoramic field of view around the aircraft.

SUMMARY

This section provides a general summary of the disclosure and is not a comprehensive disclosure of its full scope or all of its features.

In one form of the present disclosure, an aircraft fuselage comprises an element forming a skin and a load-carrying structure supporting said element forming a skin, said load-carrying structure comprising a plurality of elements forming a spar disposed parallel to an axial direction defined by the fuselage and a plurality of elements forming a frame disposed spaced apart along said axial direction, each element forming a frame being arranged substantially perpendicularly to said elements forming a spar, wherein the element forming a skin is fastened on an external perimeter of each element forming a frame by use of fastening elements configured to keep the element forming a skin away from said external perimeter and wherein the element forming a skin is made of a transparent material.

Configured in this manner, the fuselage of the present disclosure allows offering a totally panoramic view to the passengers of the aircraft thanks to the transparency of the element forming a skin constituting the outer wall of said fuselage. Moreover, this element forming a skin being distant from the load-carrying structure, the field of view of the passengers is also thereby enhanced.

According to other features, the fuselage of the present disclosure includes one or more of the following optional features considered separately or according to any possible combination:

each element forming a frame has a substantially polygonal shape including several vertices.

each fastening element comprises a tubular body comprising a first end which is secured to one of the elements forming a frame at the level of one of the vertices of said element forming a frame, and to a second end which is provided with an inner thread into which a bolt provided with a threaded rod and with a head is screwed, said bolt crossing an opening formed in the element forming a skin at the level of its threaded rod and bearing on an outer face of said element forming a skin at the level of its head.

the load-carrying structure comprises a plurality of crown-shaped sections, each of said sections being formed by at least two adjacent elements forming a frame, linked together by means of a plurality of triangle-shaped junction elements, each junction element having two ends each secured to one of said at least two elements forming a frame and a third end which is secured to an intermediate frame disposed coaxially with said at least two elements forming a frame.

The element forming a skin comprises a base envelope over which several movable portions forming access doors are linked by hinge elements.

Each movable portion is positioned between two adjacent crown-shaped sections along the axial direction.

The load-carrying structure is formed by an assembly of substantially straight tubes linked together at the level of their respective ends, said assembly forming a lattice structure.

The tubes of the load-carrying structure are made of a material selected from aluminum, titanium, or a carbon fiber reinforced composite material.

The tubes of the load-carrying structure are externally coated with a black-color varnish or paint layer, said layer allowing avoiding a reflection of light in the direction of the element forming a skin.

The element forming a skin is made of an acrylic material.

According to another aspect, the present disclosure concerns an aircraft comprising a fuselage as defined before.

In yet another form of the present disclosure, the aircraft comprises a pair of front wings and a pair of rear wings, the front, respectively rear, wings being contiguous and aligned in a plane parallel to the axial direction defined by the fuselage.

In still another aspect of the present disclosure, the front, respectively rear, wings are disposed right above a front, respectively rear, end of the fuselage.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
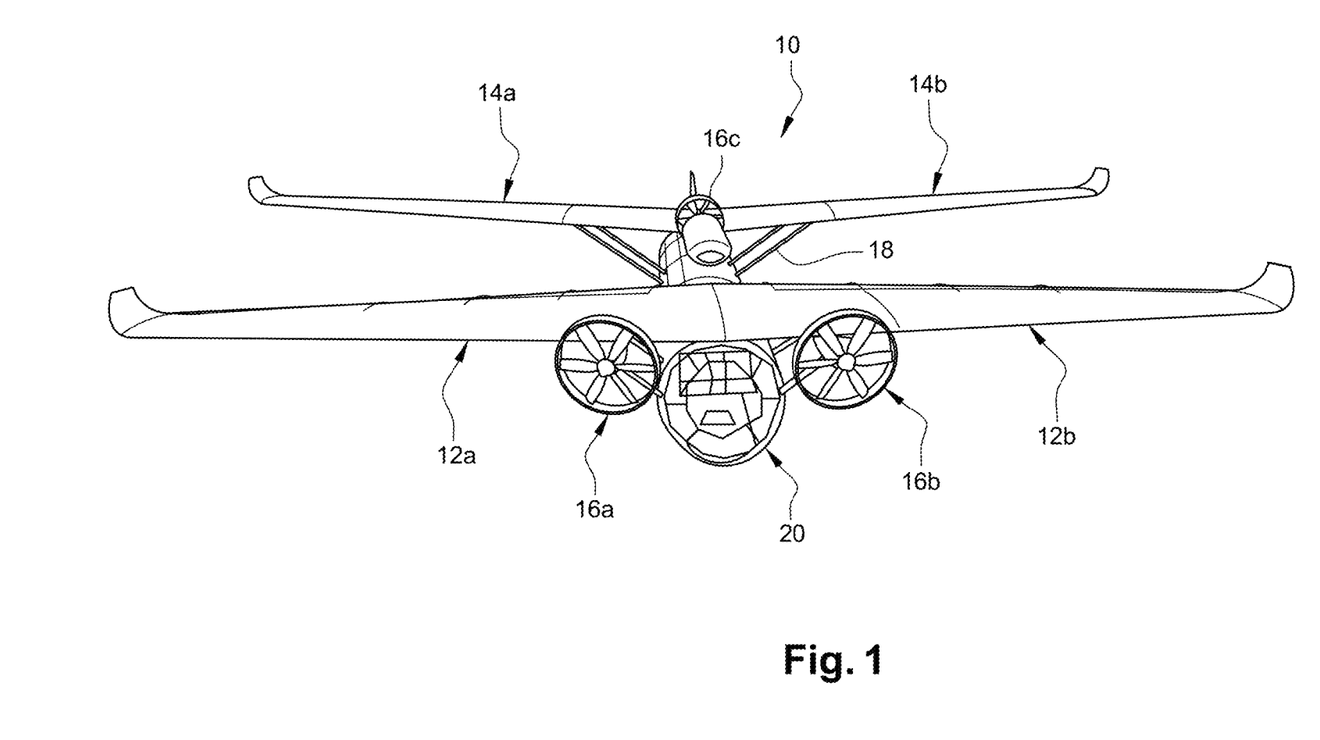
FIG. 1 is a perspective front view of an aircraft, according to the teachings of the present disclosure.
Figure 2:
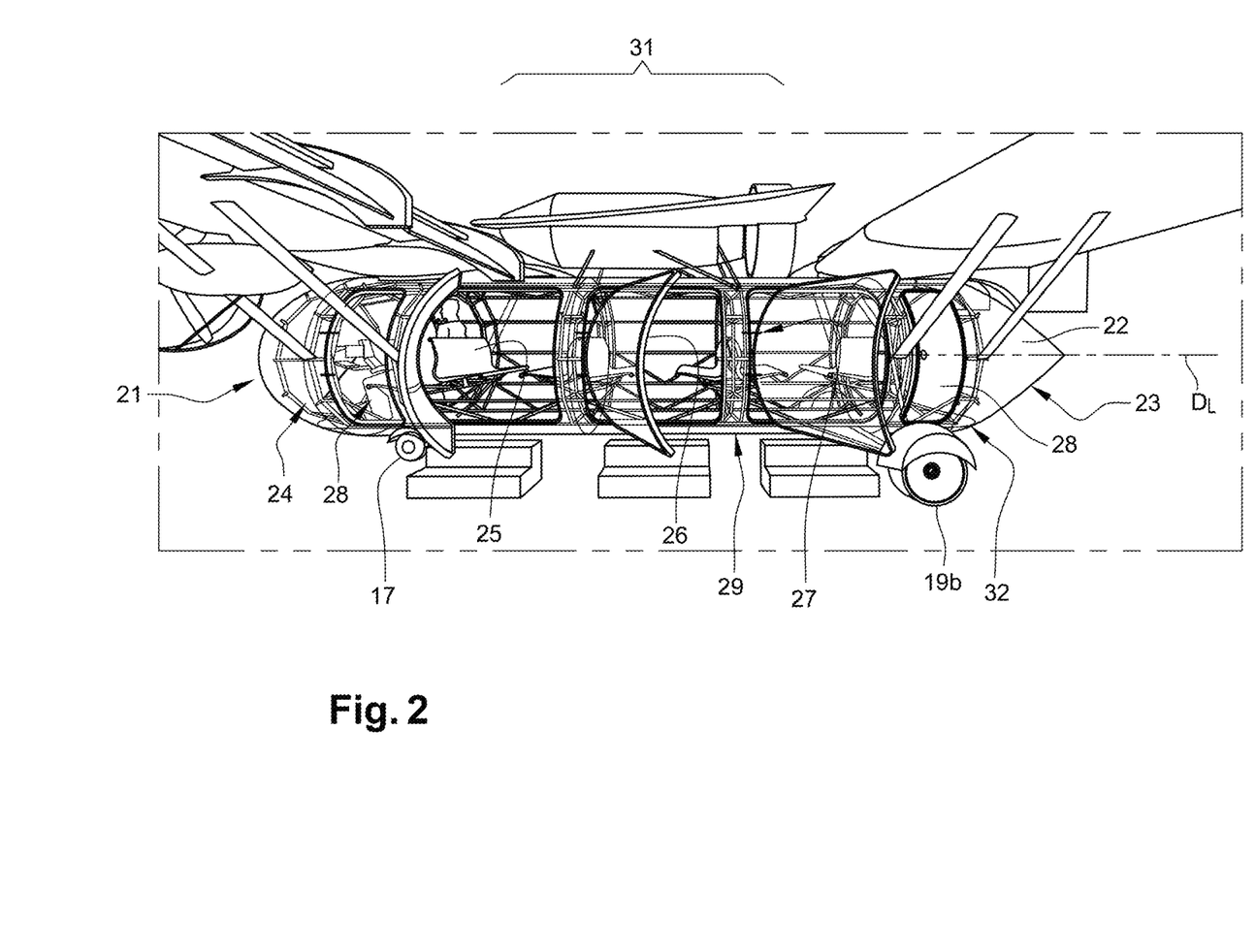
FIG. 2 is a perspective side view of the aircraft of FIG. 1, according to the teachings of the present disclosure.

As illustrated in FIGS. 1 and 2, an aircraft 10, in one form of the present disclosure, comprises a fuselage 20 which extends from a front end 21 up to a rear end 23 along an axial direction DL which constitutes an axis of symmetry for the fuselage 20. In one form, the fuselage 20 has a tubular general shape closed at the front by a hemispherical surface and at the rear by a conical surface. The aircraft 10 is equipped with a front central wheel 17 and with two, respectively left 19a and right 19b, rear wheels so that the aircraft 10 could move by rolling on the ground before takeoff and after landing thereof. The displacement of the aircraft 10 may be done by means of a pair of, respectively left 16a and right 16b, front propellers and a rear central propeller 16c driven in rotation by means of engines. A pair of, respectively left 12a and right 12b, front wings and a pair of, respectively left 14a and right 14b, rear wings are linked to the fuselage 20 through guy-wires 18. In each of the pairs, the left and right wings 12a, 12b and 14a, 14b are contiguous and aligned in a plane parallel to the direction DL so that the wings are substantially horizontal when the front and rear wheels 17, 19a and 19b rest on a horizontal planar surface. In one form, the front 12a, 12b, respectively rear 14a, 14b, wings are disposed right above the front 21, respectively rear 23, end of the fuselage 20 so that they clear a space 31 above a central portion of the fuselage 20 in which the passenger cabins are disposed. In this manner, and as described in more detail later on, the passengers benefit from a larger field of view than a conventional plane. The fuselage 20 comprises an element forming a skin 22 and a lattice load-carrying structure 24 supporting the element forming the skin 22. In one form, the element forming the skin 22 is made of a transparent material, in one form a highly-rigid and impact-resistant synthetic material, such as in one form, an acrylic material (e.g. Plexiglas™), so that the crew sitting in the cockpit defined by a front portion of the fuselage 20 next to the front end 21, as well as the passengers sitting in the passenger cabins, benefit from a totally panoramic field of view of the external environment. In particular, the element forming the skin 22 could have a thickness comprised between 3 and 10 mm.

As illustrated in FIG. 2, the passengers can access the passenger cabins through access doors 26 and the crew can access the cockpit through access doors 28. These access doors 26, 28 are formed by movable portions of the fuselage 20 which are linked by use of hinge elements 27 with a base envelope 29 of this fuselage 20, said envelope 29 being fixed with respect to the load-carrying structure 24. Moreover, for the comfort of the passengers, it is provided for equipping the aircraft 10 with seats 25, which could be fastened on the load-carrying structure 24 inside the internal space defined by the element forming a skin 22, as well as by a floor 32.

Figure 3:
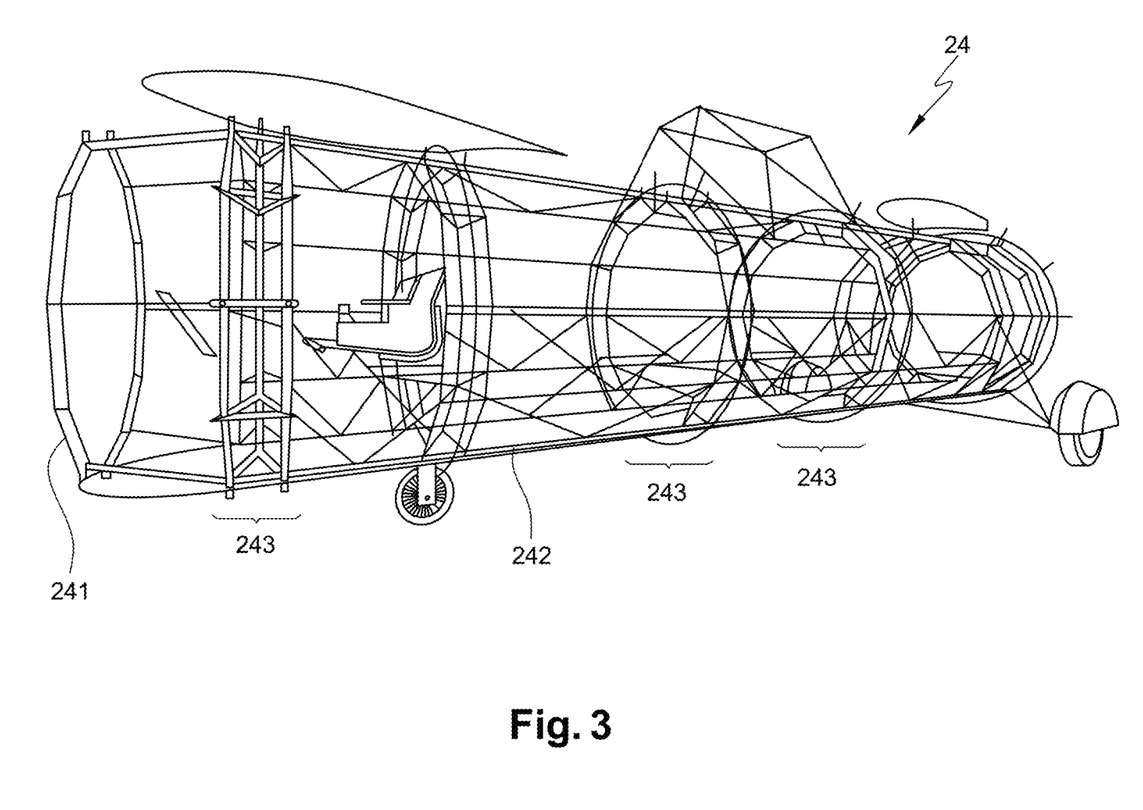
FIG. 3 is a perspective view of the load-carrying structure of the fuselage equipping the aircraft of FIG. 1, according to the teachings of the present disclosure.
Figure 4:
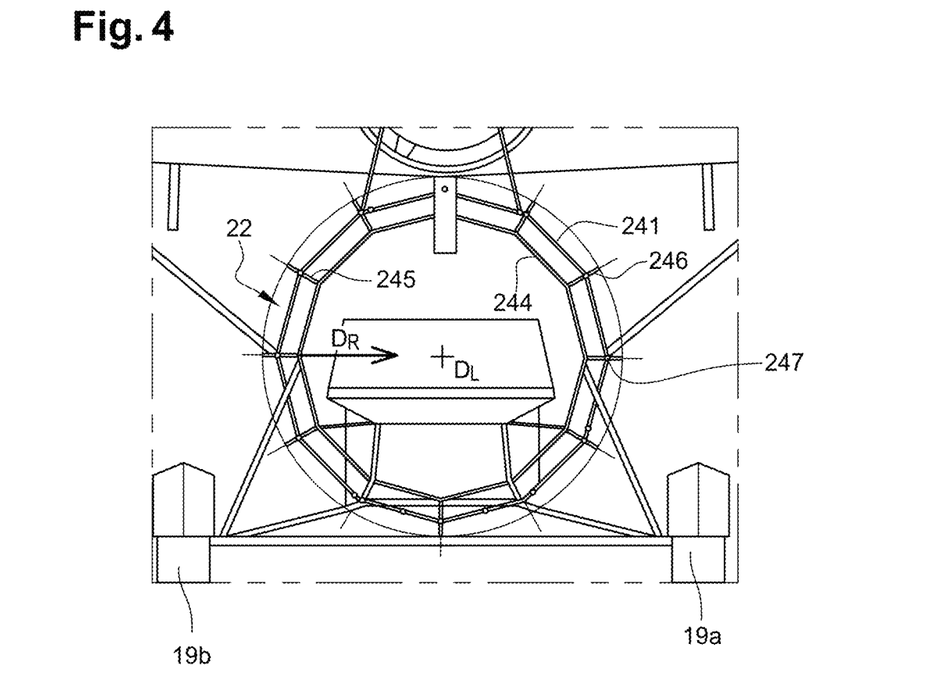
FIG. 4 is a front view of the load-carrying structure represented in FIG. 3, according to the teachings of the present disclosure.
Figure 7:
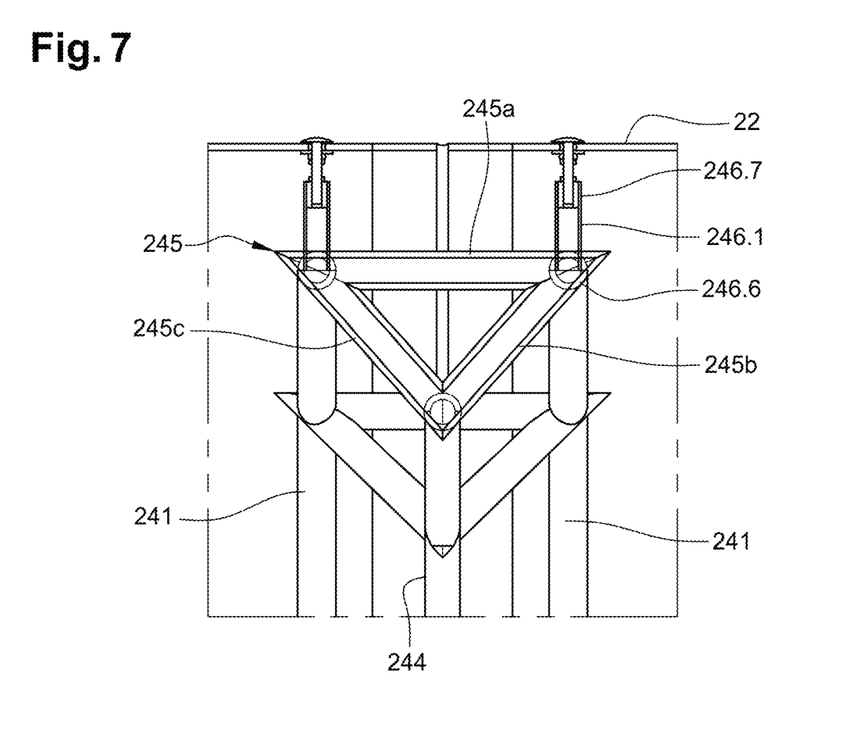
FIG. 7 is an enlarged view of a structural detail of the section represented in FIG. 5, according to the teachings of the present disclosure.
Figure 8:
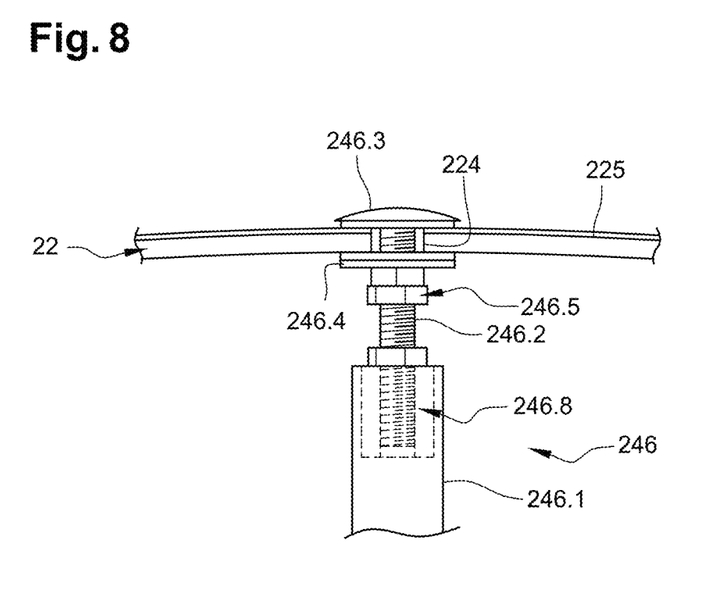
FIG. 8 is an enlarged view of a fastening element used to fasten the element forming a skin on the load-carrying structure, according to the teachings of the present disclosure.

Referring to FIGS. 3 and 4, the load-carrying structure 24 supporting the element forming a skin 22 is represented. This load-carrying structure 24 is formed by an assembly of substantially straight tubes linked together at the level of their respective ends, said assembly forming a lattice structure. In one form, these tubes may be made of a light material selected, and in one form, amongst aluminum, titanium, or a carbon fiber reinforced composite material, thereby allowing substantially lowering the weight of the fuselage 20. In one form, the load-carrying structure 24 comprises a plurality of elements forming a spar 242 arranged parallel to the axial direction DL and a plurality of elements forming a frame 241 disposed spaced apart along said direction DL, each element forming a frame 241 being arranged substantially perpendicularly to said elements forming a spar 242. As illustrated in FIG. 4, each element forming a frame 241 has an external perimeter with a substantially polygonal shape including several vertices 247. The element forming a skin 22 is fastened on the external perimeter of each element forming a frame 241 by means of fastening elements 246. As represented in FIGS. 4, 7 and 8, each fastening element 246 comprises a tubular body 246.1 directed according to a radial direction DR centered on the axial direction DL, said tubular body 246.1 comprising a first end 246.6 which is secured to one of the elements forming a frame 241 at the level of one of the vertices 247 of said element forming a frame 241, and to a second end 246.7 which is provided with an inner thread 246.8 into which a bolt 246.5 provided with a threaded rod 246.2 and with a head 246.3 is screwed, said bolt 246.5 crossing, at the level of its threaded rod 246.2, an opening 224 formed in the element forming a skin 22 and bearing on an outer face 226 of said element forming a skin 22 at the level of its head 246.3. Configured in this manner, the fastening elements 246 allow keeping the element forming a skin 22 away from the external perimeter of the elements forming a frame 241.

Figure 5:
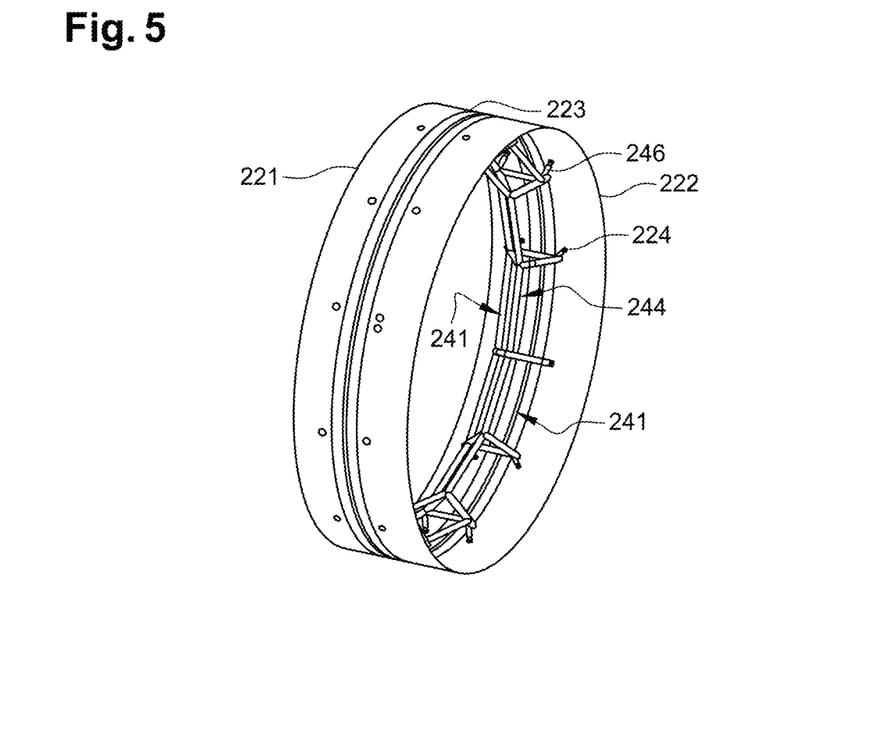
FIG. 5 is a perspective view of a section of the fuselage equipping the aircraft of FIG. 1, according to the teachings of the present disclosure.
Figure 6:
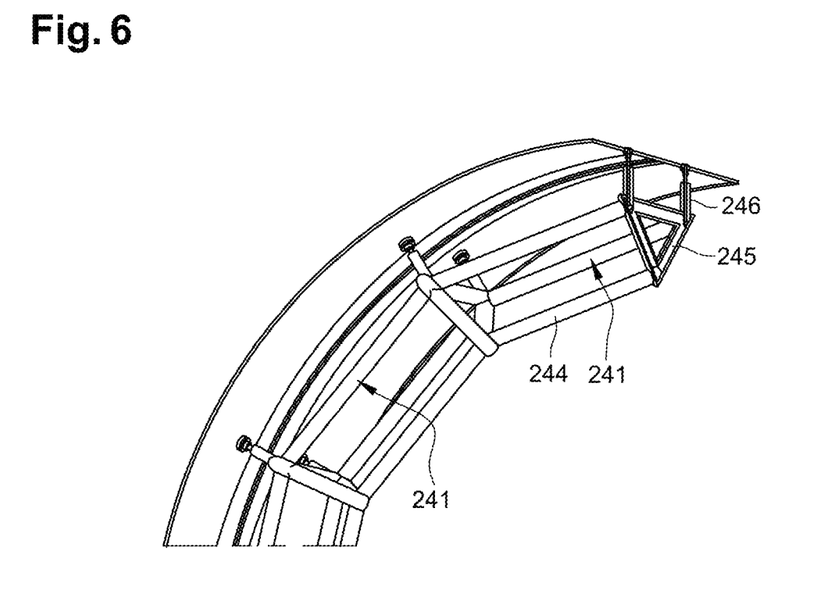
FIG. 6 is an enlarged view of a portion of the section represented in FIG. 5, according to the teachings of the present disclosure.

As illustrated in FIG. 3, the load-carrying structure 24, in one form, comprises a plurality of crown-shaped sections 243, spaced apart along the axial direction DL. As represented in FIGS. 5 and 6, each of the sections 243 is formed by at least two adjacent elements forming a frame 241, linked together by means of a plurality of triangle-shaped junction elements 245, the junction elements 245 being disposed in the continuation of the fastening elements 246. Each junction element 245 is formed by a longitudinal tube 245a directed parallel to the direction DL and by two oblique tubes 245b, 245c directed obliquely with respect to this longitudinal tube 245a, the tubes 245a, 245b, 245c of each of the junction elements 245 being aligned in a radial plane centered on the axial direction DL. The longitudinal tube 245a is secured respectively at each of its ends to one of the two adjacent elements forming a frame 241 and the two oblique tubes 245b, 245c are respectively secured at one of their ends to the longitudinal tube 245a and at the other end to an intermediate frame 244 disposed coaxially with the two adjacent elements forming a frame 241.

As illustrated in FIG. 5, the element forming a skin 22 may be constituted by the junction of several contiguous parts 221, 222 linked together by a transparent expansion joint 223. This expansion joint 223 will allow absorbing the thermal and mechanical deformations to which the parts 221, 222 are subjected. Moreover, a reflective transparent membrane may partially or totally cover the element forming a skin 22 depending on the latitude conditions.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft fuselage comprising:
    an element forming a skin; and
    a load-carrying structure supporting said element forming the skin, said load-carrying structure comprising:
        a plurality of elements forming a spar disposed parallel to an axial direction defined by the fuselage; and
        a plurality of elements forming a frame spaced apart along said axial direction, each element forming the frame being arranged substantially perpendicularly to said elements forming the spar, wherein the element forming the skin is fastened on an external perimeter of each element forming the frame by fastening elements and wherein the element forming the skin is made of a transparent material;
    wherein each element forming the frame have a substantially polygonal shape including several vertices; and
    wherein each fastening element comprises a tubular body comprising:
        a first end secured to one of the plurality of elements forming the frame at one of the vertices of one of said elements forming the frame; and
        a second end provided with an inner thread into which a bolt provided with a threaded rod and with a head is screwed, said bolt crossing an opening formed in the element forming the skin at a level of its threaded rod and bearing on an outer face of said element forming the skin at a level of its head.

2. The aircraft fuselage according to claim 1, wherein the load-carrying structure comprises a plurality of crown-shaped sections, each of said plurality of crown-shaped sections being formed by at least two adjacent elements forming the frame, linked together by a plurality of triangle-shaped junction elements, each junction element having two ends each secured to one of said elements forming the frame and a third end secured to an intermediate frame disposed coaxially with at least two adjacent elements forming the frame.

3. The aircraft fuselage according to claim 2, wherein the element forming the skin comprises an envelope over which several movable portions forming access doors are linked by hinge elements.

4. The aircraft fuselage according to claim 3, wherein each movable portion is positioned between two adjacent crown-shaped sections along the axial direction.

5. The aircraft fuselage according to claim 1, wherein the load-carrying structure is formed by an assembly of substantially straight tubes linked together at a level of their respective ends, said assembly forming a lattice structure.

6. The aircraft fuselage according to claim 5, wherein the assembly of substantially straight tubes of the load-carrying structure are made of a material selected from the group consisting of aluminum, titanium, and a carbon-fiber reinforced composite material.

7. The aircraft fuselage according to claim 5, wherein the assembly of substantially straight tubes of the load-carrying structure are externally coated with a black-color varnish or paint layer, said layer preventing a reflection of light in a direction of the element forming the skin.

8. The aircraft fuselage according to claim 1, wherein the element forming the skin is made of an acrylic material.

9. An aircraft comprising the aircraft fuselage according to claim 1.

10. The aircraft according to claim 9, wherein the aircraft comprises a pair of front wings and a pair of rear wings being contiguous and aligned in a plane parallel to the axial direction defined by the fuselage.

11. The aircraft according to claim 10, wherein the front wings are disposed above a front end of the fuselage, and the pair of rear wings are disposed above an end of the fuselage.

* * * * *